Figure 1:
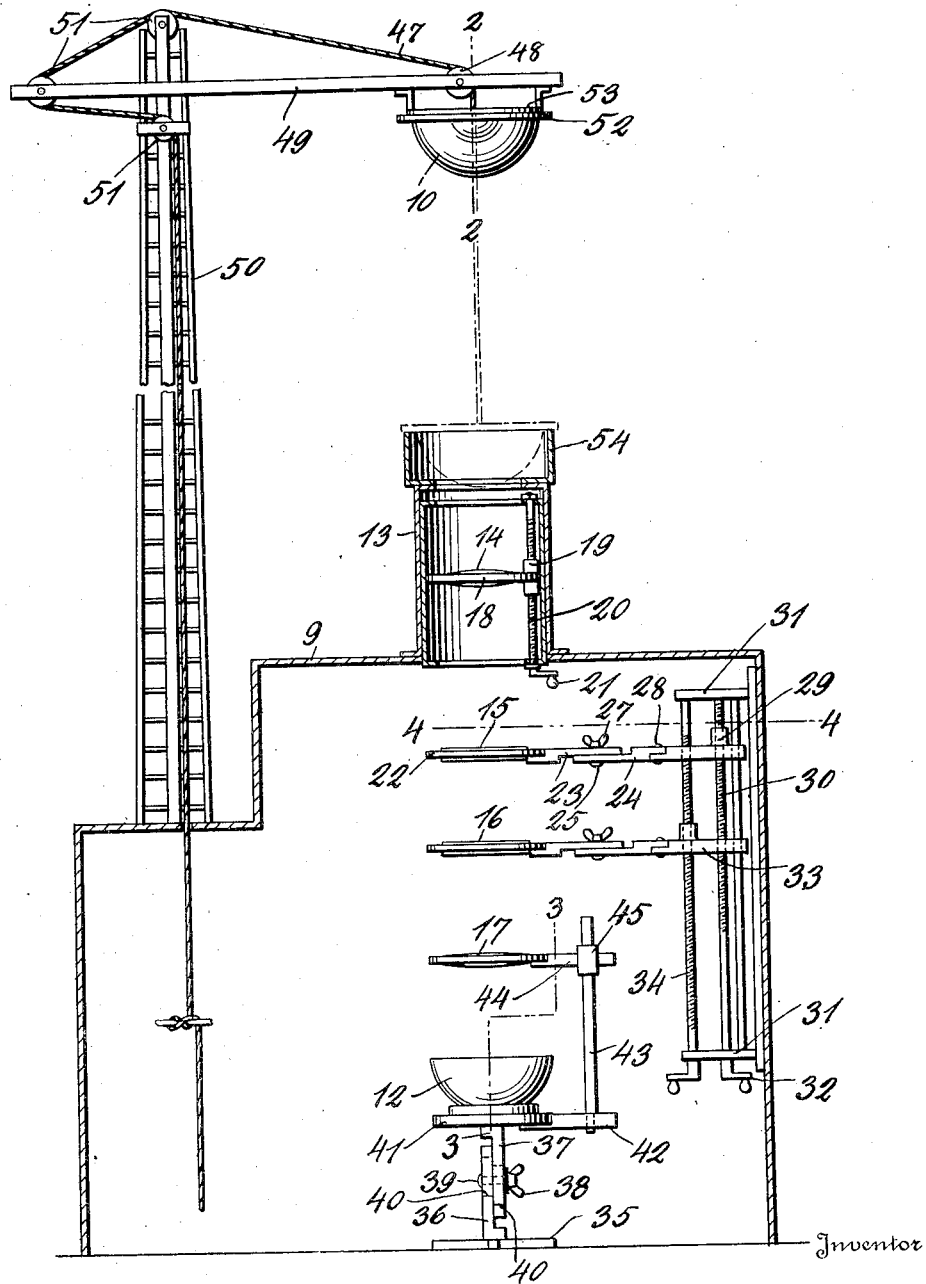

J. DE FALCO.
OBSERVATION APPARATUS.
APPLICATION FILED APR. 7, 1915.

1,157,154.

Patented Oct. 19, 1915.
2 SHEETS—SHEET 1.

Witnesses
Einar Larson

Inventor
Joseph De Falco
By
Attorneys

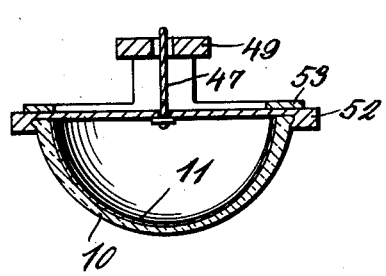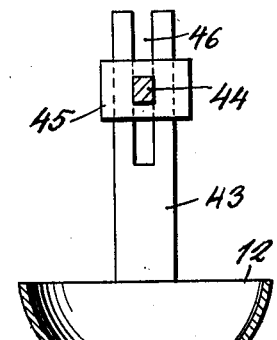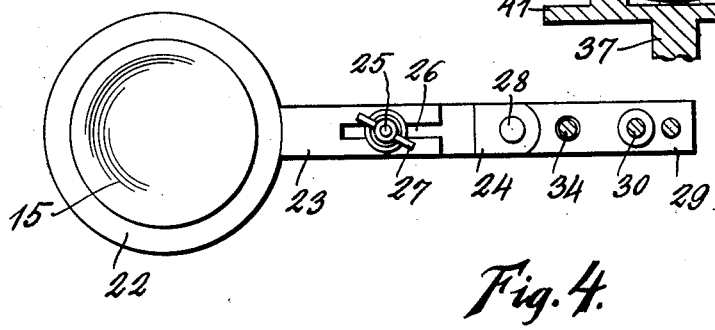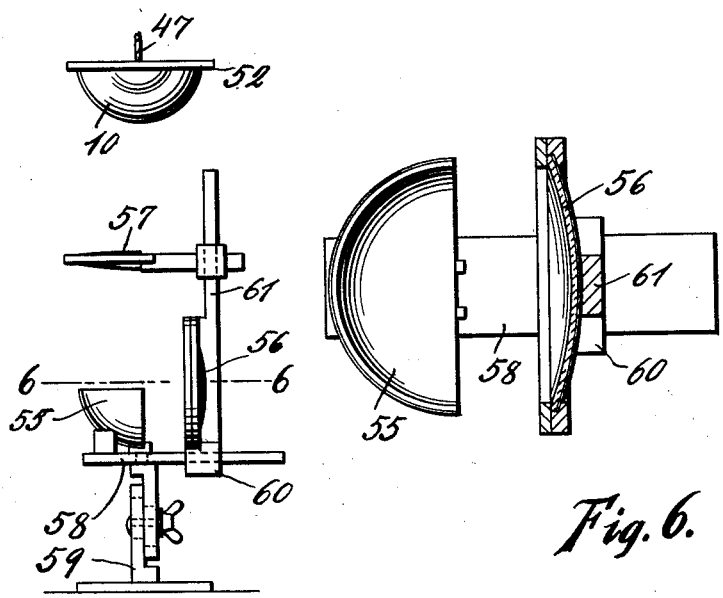

UNITED STATES PATENT OFFICE.

JOSEPH DE FALCO, OF VINELAND, NEW JERSEY.

OBSERVATION APPARATUS.

1,157,154. Specification of Letters Patent. Patented Oct. 19, 1915.

Application filed April 7, 1915. Serial No. 19,699.

*To all whom it may concern:*

Be it known that I, JOSEPH DE FALCO, citizen of the United States, residing at Vineland, in the county of Cumberland and State of New Jersey, have invented certain new and useful Improvements in Observation Apparatus, of which the following is a specification.

The apparatus which is the subject matter of the present application for patent is designed to permit an observation to be made in a building or other structure of the surrounding objects, an elevated mirror being provided which is so shaped that all objects within a complete circle are reflected.

The apparatus may be used on land, and also at sea, in which latter case it is especially applicable to submarine vessels to take the place of the periscope now in use for making observations when the vessel is submerged.

The invention also embodies a novel observation screen on which the image reflected by the mirror is thrown, as well as certain novel and improved structural details to be hereinafter described.

In order that the invention may be better understood, reference is had to the accompanying drawings, in which—

Figure 1 is an elevation of the apparatus, partly in section; Figs. 2, 3 and 4 are sectional details on the lines 2—2, 3—3 and 4—4, respectively, of Fig. 1; Fig. 5 is an elevation of a modification, and Fig. 6 is a section on the line 6—6 of Fig. 5.

Referring specifically to the drawings, 9 denotes a building or other inclosure from the interior of which an observation of the surrounding objects is to be made. At a suitable elevation above the building is mounted a mirror 10 having a reflecting surface of such configuration as to reflect objects embraced within a complete circle. To obtain this range of observation the mirror is semi-spherical, the backing 11 being on the concave side of the glass. Inside the building is a screen 12 on which the image reflected by the mirror is thrown for observation, and between the screen and the mirror are interposed suitable lenses for projecting the image upon the screen. Over an opening in the top of the building is mounted a large tube 13 containing one of the series of lenses, said lens being indicated at 14. Below this lens, inside the building, are lenses 15, 16 and 17. The lens 14 is mounted in a frame 18 having a nut 19 at one end mounted to travel up and down on a vertical screw stem 20 suitably supported in the tube 13 and provided at its lower end with an operating handle 21. The lens 15 is mounted in a frame 22 carried by a horizontal bracket arm which is in two sections, indicated at 23 and 24, respectively, and connected for longitudinal adjustment by means of a bolt 25, the member 23 having a slot 26 through which the bolt passes, and a wing nut 27 screwed on said bolt clamps the parts in adjusted position. The inner bracket arm section 24, is pivoted at 28 to a nut 29 mounted to travel up and down on a screw stem 30 supported at its top and bottom by brackets 31. The lower end of the screw stem has a suitable operating handle 32. An adjustable support similar to the one just described is provided for the lens 16, the adjusting nut being shown at 33 and its screw at 34, the latter being mounted alongside the screw 30 supported by the brackets 31. The screw 34 passes loosely through the nut 29, and the screw 30 passes loosely through the nut 33, whereby said nuts are prevented from turning on the screws and are constrained to travel up and down when the respective screws are operated. The lens mountings hereinbefore described afford simple and convenient means for focusing.

The lens 17 is supported by a stand which supports the observation screen 12. This stand comprises a base 35 from which rises a standard composed of two adjustably connected sections 36 and 37, respectively, held at adjustment by a wing nut 38 screwed on a bolt 39 passing through the lapping portions of the sections, one of said sections having a slot 40 through which the bolt passes so that the sections may be adjusted lengthwise to raise or lower the stand. The top section carries a suitable supporting base 41 for the screen, and from said base extends an arm 42 carrying at its outer end a rotatable standard 43 on which is slidably mounted a support 44 for the lens 17. As the standard 43 is rotatable, the lens support may be swung horizontally to properly position the lens 17 above the screen, and it may also be swung out of the way. The lens support 44 is an arm having at one end a suitable holder for the lens, and slidably passing at its other end through a block 45 mounted to slide up and down on the standard 43, the latter also having a slot 46 through which the arm passes. This construction enables the lens to be advanced or drawn back to properly position it with respect to the optical axis, and it may also be elevated or lowered relative to the observation screen.

The observation screen 12 is an opaque concave body or shell arranged so that its concave side faces the mirror 10 to receive and display the image reflected by the latter. The screen may be made of glass enameled or painted white to bring out the image clear and sharp, or it may be made of wood, metal or any other suitable material.

The mirror 10 is supported by a cable 47 passing over a pulley 48 at the outer end of an arm 49 supported at the top of a mast 50 of suitable height to locate the mirror at the necessary elevation. Suitable guide pulleys 51 for the cable are also provided. The cable passes down into the building 9 so that the mirror may be operated from the inside of the latter. The mirror is mounted in a suitable frame 52 to which the hoisting line or cable 47 is attached, and at the outer end of the arm 49 is rigidly mounted a ring 53 against which the back of the mirror is clamped, as shown in Fig. 1, whereby the mirror is held stationary and prevented from swaying.

At the top of the tube 13 is an enlargement 54 designed to serve as a protecting housing for the mirror 10 when the latter is not in use, it being then lowered to seat in the housing, as shown dotted in Fig. 1.

Figs. 5 and 6 illustrate a modification of the apparatus. Here, the observation screen 55 is a quarter sphere, the concave surface of which faces a concave or enlarging mirror 56. Above the screen is a semi-circular lens 57 corresponding to the lens 17. The screen 55 and the lens 57 are positioned to receive just one half of the image reflected by the mirror 10, and they are adjustable so that they may be positioned on either side of the optical axis. In order that this adjustment may be effected, the mirror is mounted on a support 58 which is rotatably mounted at the top of a standard 59 composed of adjustably connected sections similar to the sections 36 and 37 hereinbefore described. On the support 58 is mounted a slide 60 carrying the mirror 56, by which the latter may be adjusted toward and from the screen. The slide also carries a standard 61 supporting the lens 57, the lens support being similar to the support of the lens 17 to permit adjustment of said lens 57.

In the last described embodiment of the apparatus, the image is observed enlarged in the mirror 56.

It will be understood, of course, that the inclosure in which the observation screens 12 or 55 are located will be darkened. The elevated mirror 10 may be semi-spherical or substantially so, depending on the height the mirror is to be elevated. The tube 13 need not necessarily be mounted as shown in Fig. 1 of the drawing, but it may be reversed so as to extend down into the inclosure or observation chamber 9.

I claim:—

1. In an observation apparatus, an elevated spherical mirror, a screen on which the image reflected by the mirror is displayed, the displaying surface of said screen being concave, a stand supporting the screen, a rotatable standard carried by the stand, and a lens holder slidably mounted on the standard above the screen.

2. In an observation apparatus, an elevated spherical mirror, a screen on which the image reflected by the mirror is displayed, the displaying surface of said screen being concave, a stand supporting the screen, a rotatable standard carried by the stand, and a lens holder slidably mounted on the standard above the screen and adjustable laterally relative to the standard.

3. In an observation apparatus, an elevated spherical mirror, a screen on which the image reflected by the mirror is displayed, the displaying surface of said screen being concave, independently rotatable screw stems, a nut mounted for travel on one of the stems, the other stem passing loosely through the nut, a second nut mounted for travel on the second-mentioned stem, the first-mentioned stem passing loosely through said nut, and lens supports carried by the nuts, said lens supports being located above the screen.

4. In an observation apparatus, an elevated spherical mirror, a screen on which the image reflected by the mirror is displayed, the displaying surface of said screen being concave, independently rotatable screw stems, a nut mounted for travel on one of the stems, the other stem passing loosely through the nut, a second nut mounted for travel on the second-mentioned stem, the first-mentioned stem passing loosely through said nut, and lens supports carried by the nuts, said lens supports being located above the screen, and said supports comprising bracket arms pivoted to the nuts.

5. In an observation apparatus, an elevated spherical mirror, a screen on which the image reflected by the mirror is displayed, the displaying surface of said screen being concave, independently rotatable screw stems, a nut mounted for travel on one of the stems, the other stem passing loosely through the nut, a second nut mounted for travel on the second-mentioned stem, the first-mentioned stem passing loosely through said nut, and lens supports carried by the nuts, said lens supports being located above the screen, and comprising bracket arms pivoted to the nuts, said bracket arms comprising adjustably connected sections.

6. In an observation apparatus, a mirror, a screen on which the image reflected by the mirror is displayed, an elevated support for the mirror, means for raising and lowering the mirror, an inclosure in which the screen is located, said inclosure having an opening through which the image passes, and a housing above said opening adapted to receive the mirror when the same is lowered.

In testimony whereof I affix my signature in presence of two witnesses.

JOSEPH DE FALCO.

Witnesses:
   JOSEPH PARDADIO,
   FRANK BALSAMO.